July 30, 1963 P. M. LEMOIGNE 3,099,426
PARACHUTE
Filed March 31, 1961 5 Sheets-Sheet 1

July 30, 1963 P. M. LEMOIGNE 3,099,426
PARACHUTE
Filed March 31, 1961 5 Sheets-Sheet 2

United States Patent Office 3,099,426
Patented July 30, 1963

3,099,426
PARACHUTE
Pierre Marcel Lemoigne, 103 Ave. Verdier,
Montrouge, Seine, France
Filed Mar. 31, 1961, Ser. No. 99,769
Claims priority, application France Apr. 7, 1960
5 Claims. (Cl. 244—145)

This invention sets out to improve the stability, manoeuvrability and general efficiency and reliability of parachutes.

In parachute jumps lateral instability constitutes a serious problem and has made it necessary heretofore in the design and construction of parachute canopies to use considerably larger canopy areas than the areas that would normally be required to attain a desired maximum descent velocity in still air, the additional area being found necessary to avert excessive pendular motion. This in turn has increased the cost and weight of parachutes required to achieve a given low descent velocity, and/or has set an upper limit to the descent velocity attainable with a given size of parachute. It is, therefore, an object of this invention to provide an improved parachute canopy design which will inherently possess considerably increased lateral stability over the values heretofore attainable, and thereby to reduce the size, weight and cost of parachute canopy required for attaining a prescribed maximum descent velocity, or vice versa.

Another serious problem that has not received a fully satisfactory solution is that of controlling a parachute jump. While some degree of control is of course possible by an experienced parachutist with the currently available equipment, the possibilities are very limited, and it is not possible to cover any extensive horizontal distances as may be required in peace and in war for avoiding dangerous terrain or hostile territory.

It is therefore an object of this invention enormously to improve the manoeuverability of a parachute whereby extremely large horizontal distances can be covered safely and reliably. In this connection, an object of the invention is to convert a substantial proportion of the potential energy present as aerostatic pressure exerted on the parachute canopy during descent of the parachute, into kinetic energy of lateral motion, thereby increasing the ratio of the horizontal velocity component to the vertical velocity component of the parachute.

Another object is to make it possible to steer a parachute both in azimuth and in elevation (i.e. control the vertical velocity) with a degree of positiveness not believed possible heretofore.

In accordance with an aspect of the invention, there is provided a parachute including a plurality of stabilizer elements bridging upper portions of at least some of the rigging lines of the parachute adjacent the connections thereof with the parachute canopy. The stabilizer elements may have side edges attached to the upper portions of the rigging lines but are substantially unattached to the canopy across the upper edges of said elements, thereby providing a stabilizing upward air-flow between said elements and the canopy.

In another aspect there is provided a parachute having an asymmetrically contoured canopy providing reduced resistance to air-flow in a direction toward a predetermined side of the canopy whereby the parachute in descent will assume a substantial horizontal component of motion in said direction, and stabilizer elements spaced on opposite sides of the canopy transversely to said direction and partly bridging the spaces between rigging lines of the parachute for stabilizing the motion of the parachute in said direction.

In preferred forms of the invention, there are further provided air nozzle means formed through the canopy to direct air from the under to the upper surface of the canopy along flow paths having a horizontal component in a common general direction whereby to impart to the parachute during descent a horizontal motion component in an opposite direction. The nozzles may be selectively manipulated by the parachutist during descent for controlling the flight path in azimuth and/or elevation.

Exemplary embodiments will now be described with reference to the accompanying drawings, wherein.

Figure 1:
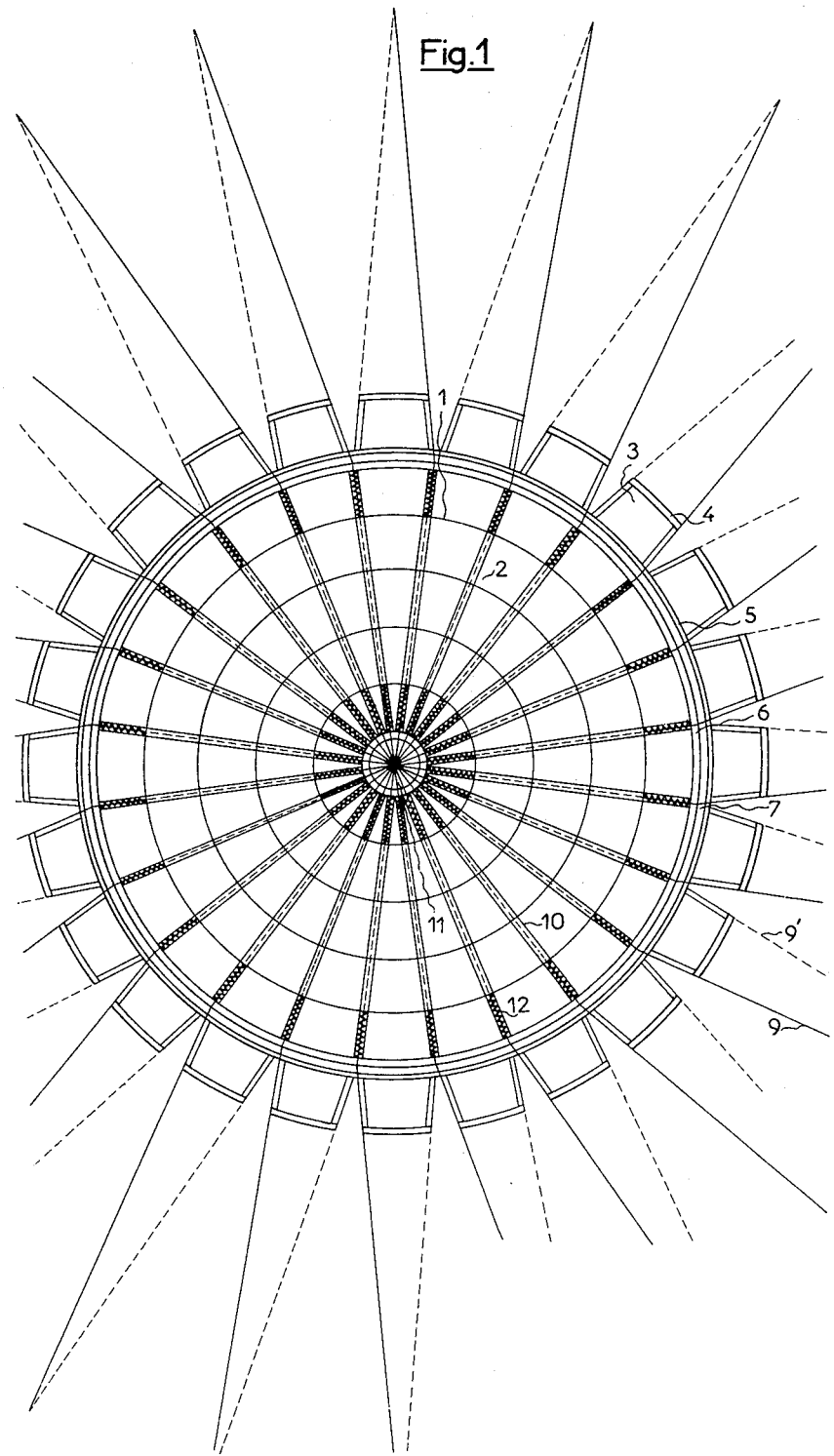
FIG. 1 is a plan view of a flat parachute constructed according to the invention.
Figures 2, 2A:
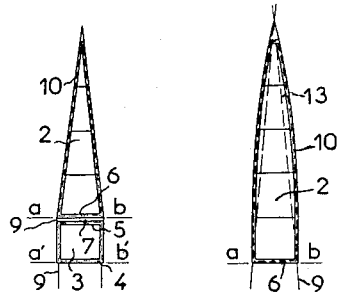
FIG. 2 shows in detail a canopy gore and adjacent stabilizer panel as used in the parachute of FIG. 1.
FIG. 2a shows a conventional gore of curved construction.

Referring first to FIGS. 1 and 2, a parachute canopy 1 is formed from a number of gores such as 2, to the leading edge of each of which a stabilizer element or panel such as 3 is attached.

In the embodiment shown in FIG. 2, each panel 3 is of substantially rectangular, or square, shape, and is reinforced along each of its four sides by a reinforcement strip, with the reinforcement strips extending along the lateral sides of panel 3 forming extensions of the conventional reinforcement strips 10 extending along the sides of the gore. The upper side 5 of the panel may be equal in length to, or shorter than, the adjacent edge 6 of gore 2, and is connected thereto at both ends by the rigging lines 9, while being unattached to the canopy throughout the extent of said sides 5 and 6 intermediate their ends.

The rigging lines 9 are suitably attached by means of zigzag stitches 12 to the reinforcing tapes or strips 10 and the stitch lines are extended along the lateral sides of the stabilizer panels 3 thereby interconnecting the adjacent panels. Thus the traction forces applied to the rigging ropes, especially at the initial opening impact, are directly transmitted to the reinforcement strips 10 which are continuous from the leading edge 6 to the trailing edge, i.e. the edge of the central air-escape opening 11, averting excessive strain on the fabric forming the gores, in contrast to what occurs in the conventional gores of curved construction as shown in FIG. 2a. In this latter case the tension forces applied to the lines 9 tend to be transmitted to the canopy along the straight lines such as 13 (FIG. 2a) through the fabric itself rather than through the reinforcing tapes 10.

In FIG. 1 the rigging lines 9 are shown in full lines while the dotted lines 9' indicate the rigging lines of the adjacent canopy gores when the parachute is in assembled condition.

Figure 3:
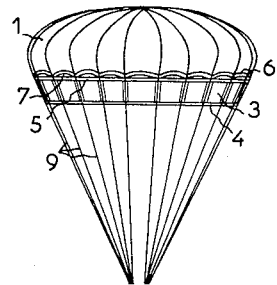
FIG. 3 shows the parachute in flight.
Figure 5:
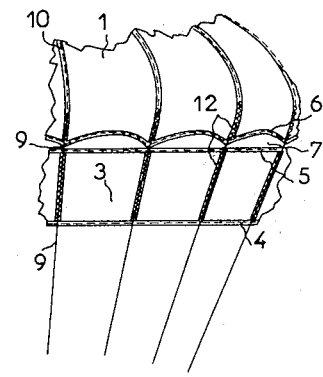
FIG. 5 is a larger-scale view of a fragment of the parachute shown in FIG. 3.

In FIGS. 3 and 5 which show the parachute as it appears during descent, gaps 7 are shown which open up between the upper edge of each stabilizer panel 3 and the lower edge 6 of the corresponding canopy gore. It is these spaces which provide a stabilizing flow of air producing a lift effect considerably enhancing the efficiency of the parachute canopy, as presently explained.

Figure 4:
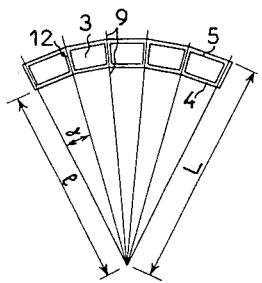
FIG. 4 shows the contours of the stabilizer panels.

It will be noted that the composite surface formed by all of the stabilizer panels 3 is substantially frusto-conical or rather frusto-pyramidal, so that the lateral sides of each panel 3 form the two inclined sides of a trapezoid the larger base of which is shown at 5 and the smaller base at 4. FIG. 4 illustrates the manner in which the precise geometrical shape of the trapezoidal elements can be determined from the apical angle $\alpha$ of the triangle formed in the normal condition of two adjacent suspension ropes, with the base of the triangle being the length of the base edge of the canopy gore.

In understanding the outstanding improvement in efficiency provided by the stabilizer elements, it is convenient to refer to two novel concepts of parachute design, viz. "parachutal value" and "perimetric coefficient."

I define "parachutal value" as the ratio of load to landing velocity per unit area of the parachute canopy. Thus $$V_p = \frac{P}{S \times V_a}$$

where $V_p$ is parachutal value, P is weight of load, S is total area of the complete parachute supporting structure or canopy, and $V_a$ is landing velocity.

The phrase "perimetric coefficient" is used to designate a coefficient indicative of the aerodynamic characteristics of a parachute supporting structure in accordance with the formula $$C_p = \frac{P^2}{S}$$

where P is the perimeter and S the total area of the complete supporting structure. It is noted that the formula just given is analogous to a well-known formula of aerodynamics widely used for determining the shape of an aircraft wing.

According to a specific object of this invention, the improved parachute construction described substantially increases both the parachutal value and perimetric coefficient.

With the provision of the stabilizing means described, it is found perfectly feasible to use substantially flat parachute canopies, wherein the perimetric coefficient substantially approaches its maximum value.

For a given set of performance and stability characteristics, the construction of a parachute canopy designed in accordance with the teachings of this invention turns out to be much cheaper and simpler than that of conventional parachutes. The reduction in cost arises basically from the increase in parachutal value, which permits a corresponding reduction in the amount of fabric required, length of reinforcement strips and suspension lines, and also in the extent of stitching operations that are required.

The resulting parachute construction is, furthermore, substantially simpler and more rational since the novel canopy design involves substantially only flat surfaces and straight lines, so that the patterns of stress distribution in the canopy in service can be more accurately predetermined and reinforcements can be provided in the canopy as may be required by the computed distribution pattern.

Figure 7:
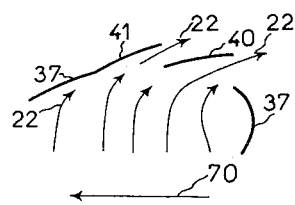
FIG. 7 shows in section one of the five "propellant" gores in the rear of the canopy as shown in FIG. 7, and illustrates the accelerating effect resulting from a different arrangement of the air nozzles mounted on said rear gores.
Figure 6:
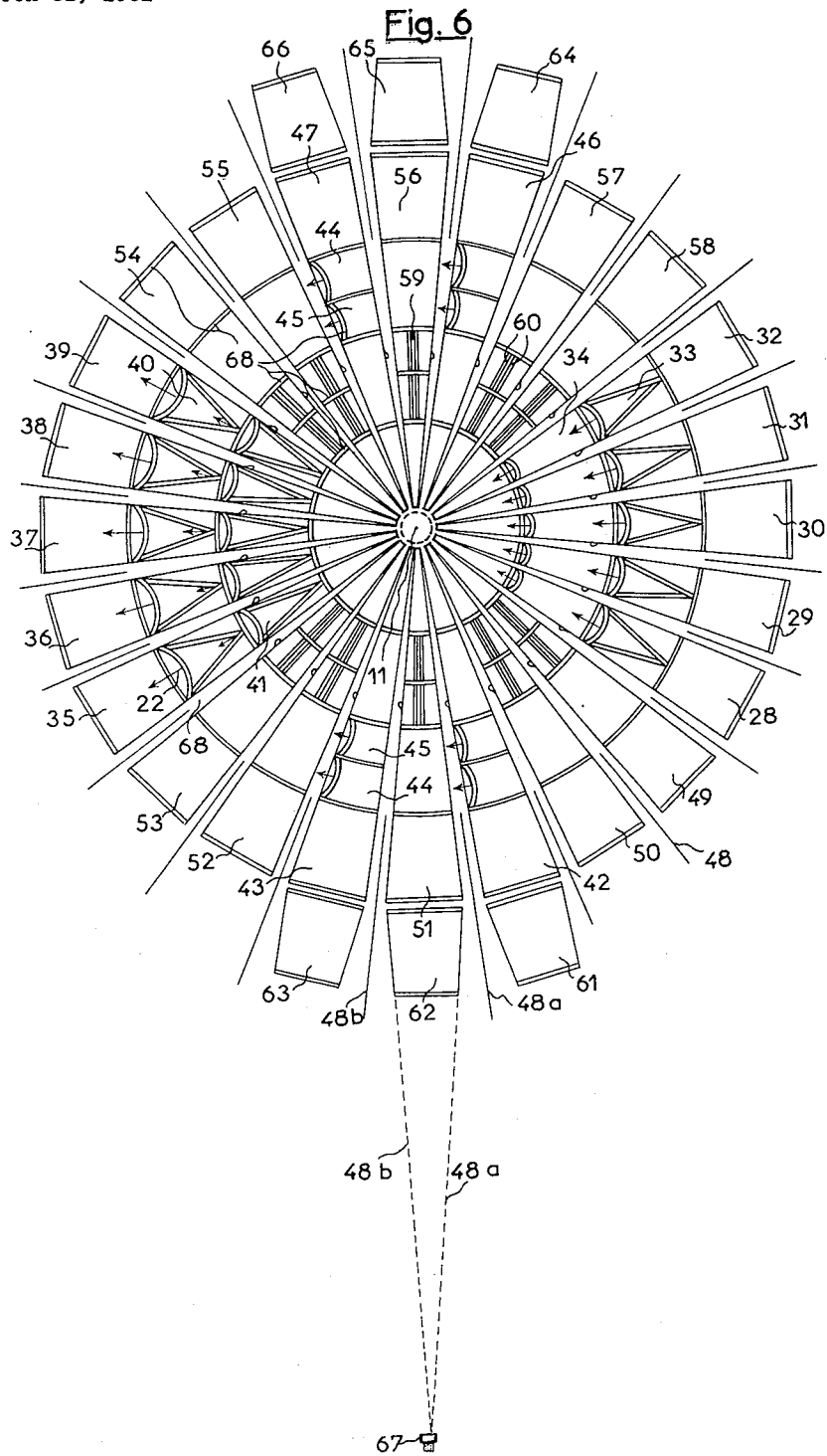
FIG. 6 illustrates a flattened plan view of a "self-propelled," dirigible type of parachute in accordance with one form of the invention, with the canopy gores and lateral stabilizer elements being shown in disassembled condition, the rigging lines being shown at their correct locations but unattached.
Figure 8:
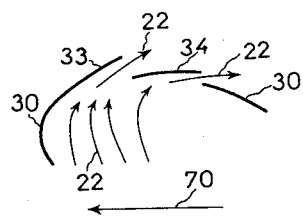
FIG. 8 is a similar view of one of the five propellant gores at the front of the canopy shown in FIG. 6, as well as illustrating the propulsive thrust effect produced by the flow of the airstream through the nozzles mounted on the front gores.
Figure 10:
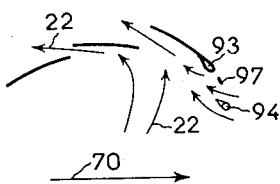
FIG. 10 illustrates in section the arrangement of the air nozzles and inflatable frame elements on a front gore of canopy shown in FIG. 9.
Figure 11:
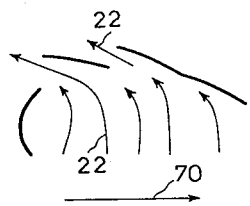
FIG. 11 is a similar view of the nozzle arrangement on one of the rear gores of the same canopy.
Figure 12:
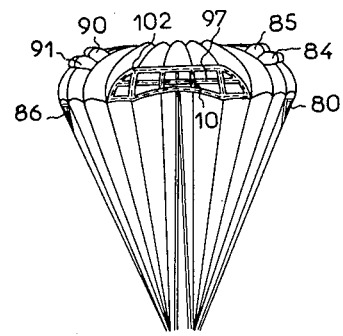
FIG. 12 is a smaller-scale view of the parachute shown in FIG. 9, in flight.

The form of the invention shown in FIGS. 6–8 is provided with stabilizer elements of the type described above in only two spaced lateral areas of the canopy at 61, 62, 63 and at 64, 65, 66.

The form of the invention illustrated in FIG. 6 and now to be described further embodies an important feature which resides in converting a substantial fraction of the aerostatic pressure energy exerted on the parachute canopy during descent into kinetic energy of lateral motion, so as to increase the ratio of the horizontal velocity component to the vertical velocity component in the flight path of the parachute. This is accomplished by providing in the canopy, air-flow channelling means or air nozzles for directing a portion of the atmospheric air pressurized by the descent of the canopy through the atmosphere, into horizontal air jets which exert a lateral thrust on the parachute. Further, the air jets thus created are controllable by the parachutist in order to steer the parachute both in elevation and in azimuth.

The canopy of the self-propelled steerable parachute shown in FIG. 6 comprises twenty-four gores divided into a plurality of groups to which specific functions are assigned (in addition of course to the common general function of slowing down the descent velocity). Thus there are five front propellant gores 28 through 32, five rear propellant gores 35 through 39, two right warping gores 42 and 43, two left warping gores 46 and 47, five right shock-absorbing gores 49 through 53 and five left shock-absorbing gores 54 through 58. It will be understood that the terms "forward," "rear," "right" and "left" refer to the horizontal component of the glide path of the parachute which is indicated by the arrow 70 in FIGS. 7 and 8.

The five front propellant gores 28–32 are positioned in a consecutive array on the front side of the canopy (left of FIG. 6), and each is formed with two aligned channels 33 and 34 (also see FIG. 8) serving as "jet nozzles" to channelize the relative airstream produced by the descent of the canopy through the atmosphere, along the path indicated by arrows 22 especially in FIG. 8 i.e. from the under to the upper surface of the canopy in a common direction reverse from that of the forward glide component of the parachute indicated by arrow 70. Similarly the five rear propellant gores 35–39 are positioned in a consecutive array diametrically opposed to array 28–32 and each is formed with two aligned channels such as 40 and 41 (also see FIG. 7) acting as jet nozzles to channelize the airstream through the canopy in the same general direction as the front jets. Thus a substantial fraction of the aerostatic energy created by air pressure on the descending canopy is converted into kinetic energy for propelling the parachute along a path having a substantial horizontal component of motion.

The two pairs of right and left warping gores, 61—63 and 64—66 respectively are positioned as shown, immediately in front and to the rear of the laterally-extending gores 62 and 65 of the canopy, and each is provided with a pair of channels 44 and 45 which serve a propelling function similar to that above described and, in addition, serve a steering function. Thus by controlling the warp of the right warping gores 42 and 43, the parachute can be steered leftward, and by controlling the left warping gores 46 and 47 the parachute can be steered rightward.

The shock-absorbing or damping gores 49 through 58 are each provided with a longitudinal slit 59 over a minor segment of their length, with suitable reinforcing tapes being stitched along the sides of each slit. The effective opening of the slits can be adjusted by one or more suitable loops 60.

The stabilizer panels 61 through 66 are associated as shown with each of the two groups of three gores 42, 51, 43 on one side and 44, 56, 46 on the other side of the canopy, and their action is generally the same as in the first described embodiment, except that they only exert their stabilizing action laterally so as to provide a forward guiding action for the parachute along its glide path.

In operation, it will be understood that the front nozzles such as 33—34 cooperate to produce radially converging air jets directed towards the center aperture 11 of the chute, while the rear nozzles such as 41—40 cooperate to produce radially diverging air jets directed rearwardly of the canopy, whereby all of the nozzles coact to generate a positive propulsive thrust component in the forward direction along the glide path. The longitudinal contouring of the air nozzles such as 33, 34, 41, 40 is of considerable importance and FIGS. 7 and 8 illustrate typical nozzle contours usable according to the invention. The flight path of the improved parachute can be effectively controlled to a high degree about the three axes of yaw, roll and pitch by manual action on appropriate gores of the canopy. Thus, the gores 28 through 32 and 35 through 39 hereinabove referred to as the propellant gores, can equally well be termed the elevator gores since by acting on the position of selected ones of these gores the parachutist is able to alter the angle and amount of propulsive thrust in the forward direction and thereby increase or decrease the angle of the glide path to the horizontal plane within a substantial range, i.e. control the glide path about the pitch axis of the parachute, and also control the rate of the glide. Similarly selective action on the lateral warp (or "aileron") gores 42—43 and 44—46 permits control about the bank and yaw axes, i.e. steering of the parachute. It will thus be seen that my improved parachute is provided, in effect, with control surfaces whereby the parachute can be piloted and manoeuvered (within limits) in the manner of an aircraft thus greatly enhancing the flexibility and safety of parachute descents, as may be required for selecting an accurate landing site or for evasive manoeuvers as in combat.

It will be understood that in FIG. 6 as in FIG. 1, the parachute canopy is shown in flattened-out condition prior to effective assembly with the gores separated, and that actually all the rigging line such as 48a and 48b would be connected at their outer ends as at 67 to a common harness member. Further, in that figure, the double lines (such as those designated 68) all indicate reinforcement tapes, while reference 69 designates one of a circular array of loops used in the folding and packing of a parachute.

The form of the invention illustrated in FIGS. 9 to 12 embodies a number of additional desirable features. The general arrangement of the canopy is somewhat similar to that shown in FIG. 6, the canopy including twenty-four gores which may be broadly broken down as follows: five front and five rear propellant or elevator gores (as identified by the rigging lines v, x, y, a, b, c and j, k, l, m, n, o respectively); four right and four left warping gores (identifiable by rigging lines q, r, s, t, u and d, e, f, g, h respectively) provided with the nozzles such as 88 through 91 and 82 through 85, and six slitted shock-absorber gores (between the rigging lines c—d, h–j, o–q and u—v).

It is noted that the stabilizer panels are ten in number, including a left-hand group 80, 63, 62, 61 and 81 and a right-hand group 86, 66, 65, 64 and 87. The two groups rather than being diametrically opposed are displaced in the rearward direction. Moreover, in each group the two end stabilizers i.e. 80, 81, 86 and 87 are triangular in shape and only half as large in area as the remainder. This is found advantageous in avoiding excessive angularly directed forces in the fabric, and in improving the flowpath of the air filaments towards the side nozzles.

Moreover, in this form, means are provided for imparting to the canopy and increased aspect ratio (as this phrase is used in aircraft construction) and thereby reducing the resistance of airflow in a forward direction and increasing forward gliding velocity relatively to downward or falling velocity. The increase in aspect ratio is achieved by reducing the frontal surface area of the canopy and for that purpose there is formed a cutout 92 in the canopy adjacent one side of it, which thereby constitutes the leading edge in respect to the horizontal motion component of the parachute in use, indicated by arrows 70. The cutout 92 is defined by preferably tubular and inflatable reinforced edges along its top 93, bottom 94 and sides 95 and 96 providing a kind of stiffener frame. Further, one or more stretcher tapes such as 97 are bridged across the cutout to take up circumferential forces developed in flight. Horizontally spaced tapes such as 102 (FIG. 12) may be further provided across the cutout.

According to one advantageous feature in this form of embodiment, the stiffener frame provided by the side edges of the cutout 92 is preferably provided inflatable. In this case the elements such as 93 through 96 of the afore-mentioned stiffener frame would be provided in the form of tubular elements of airtight fabric preferably of streamlined sectional contour and interconnected for equal distribution of air pressure therein.

Preferably some or all of the rigging lines may be provided with cover sheaths such as 98 made of suitable fabric e.g. rayon, extending around suitable free lengths of the lines to protect the stabilizer elements from damage on initial opening of the canopy.

Figure 9:
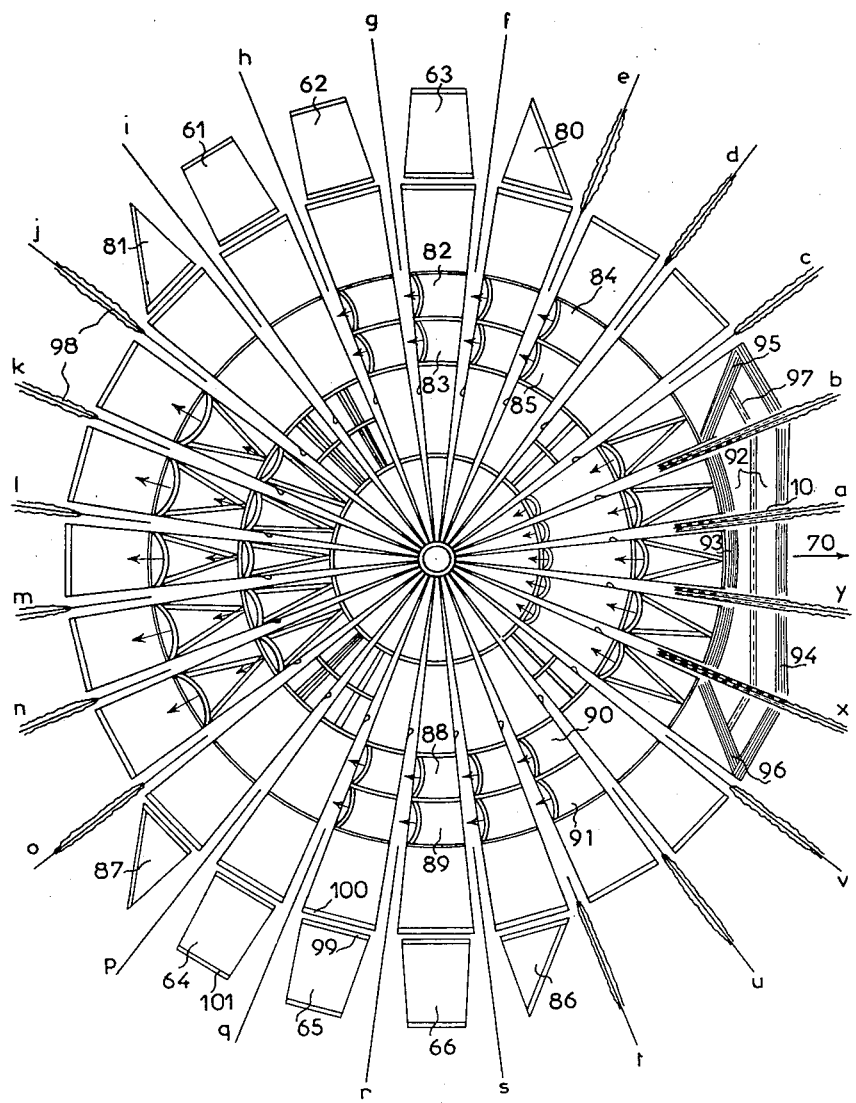
FIG. 9 is a view similar to FIG. 6 showing a self-propelled, dirigible parachute according to another form of the invention.

A further feature shown in FIG. 9 (and applicable to other embodiments) is that the larger base 99 of each stabilizer panel is somewhat shorter than the large base edge of the corresponding gore 100; that is, the base 99 of the panel is the length of the chord corresponding to the arc formed by the base of the gore when the canopy is spread out. It may also be pointed out that the length ratio of the larger base 99 to the smaller base 101 of the panels is predetermined so as to provide optimum tension in the fabric and maximum efficiency of the stabilizer panels.

What is claimed is:

1. In a parachute having a canopy, first air nozzle means formed on one side of the canopy for directing air from the under to the upper surface of the canopy and toward the center of the canopy and further air nozzle means formed on the opposite side of the canopy for directing air from the under to the upper surface of the canopy, and away from the center of the canopy, whereby to impart to the parachute during descent a horizontal component of motion toward said one side.

2. In a parachute as defined in claim 1, a cutout in the canopy adjacent the periphery thereof in a predetermined area of said periphery for reducing resistance against horizontal displacement of the parachute in the direction toward said area.

3. A parachute having a canopy, rigging lines connected to spaced points of the canopy periphery, first air nozzle means formed on one side of the canopy for directing air from the under to the upper canopy surface toward the canopy center and further air nozzle means formed on the opposite side of the canopy for directing air from the under to the upper canopy surface away from the canopy center whereby to impart to the parachute during descent a horizontal component of motion toward said one side, and a pair of arrays of stabilizer elements positioned intermediate said first and second air nozzle means, each said element having side edges connected to upper portions of adjacent rigging lines to bridge the spaces therebetween for lateral stabilization of the parachute along its said path of motion.

4. In a parachute, a canopy having a plurality of diametrically opposed gores exceeding four, a first said gore having an air nozzle means therein for directing air from the under to the upper surface of the gore and toward the center of the canopy, a second gore diametrically opposite to the first said gore, having an air nozzle means therein for directing air from the under to the upper surface of the canopy and away from the center of the canopy, whereby the air leaving said nozzles is directed to impart a horizontal component of motion to the parachute in a direction opposite to the air flow.

5. A parachute as defined in claim 4 including twenty-four gores and wherein the nozzle means are provided in diametrically opposed sets of five adjacent gores.

References Cited in the file of this patent

UNITED STATES PATENTS

| | | |
|---|---|---|
| 2,384,416 | Derry | Sept. 4, 1945 |
| 2,562,799 | Kowalski | July 31, 1951 |
| 2,746,699 | Hart | May 22, 1956 |
| 2,764,375 | Lemoigne | Sept. 25, 1956 |

FOREIGN PATENTS

| | | |
|---|---|---|
| 146,525 | Austria | July 10, 1936 |
| 358,596 | Italy | Apr. 22, 1938 |